Figure 1:
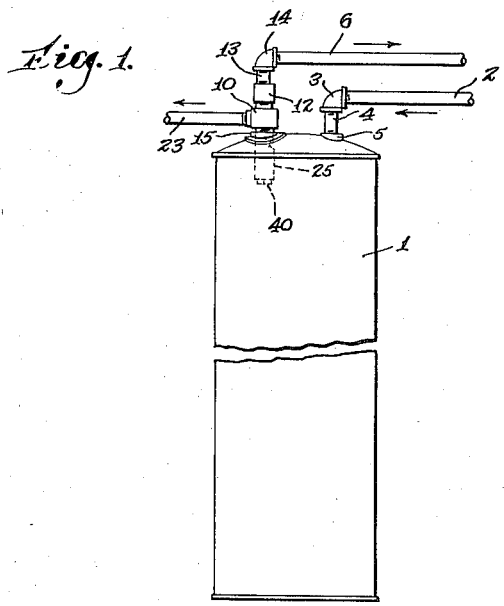

Dec. 22, 1936.   R. B. ALLEN   2,065,417
PRESSURE, VACUUM, AND TEMPERATURE RELIEF VALVE

Filed Jan. 10, 1934

Inventor
Russell B. Allen
by James R. Hodder
Attorney

Patented Dec. 22, 1936

2,065,417

UNITED STATES PATENT OFFICE 2,065,417

PRESSURE, VACUUM, AND TEMPERATURE RELIEF VALVE

Russell B. Allen, Lexington, Mass., assignor to J. W. Moore Valve Corporation, Everett, Mass., a corporation of Massachusetts Application January 10, 1934, Serial No. 706,094

1 Claim. (Cl. 277—61)

My present invention is a novel and improved valve construction wherein a pressure relief, vacuum release, and fusible temperature plug may all be utilized in combination with an inlet or outlet fixture in a boiler, thus enabling a single fixture to provide for these various fittings.

Heretofore, in boiler constructions it has been customary and considered essential to have a number of fittings or openings into a boiler, such for example as the ordinary hot water boiler used for domestic hot water purposes. One or more fittings for an intake or supply are provided, another fitting for the outlet or service pipe, and still other fittings for the pressure or vacuum relief, or both, have been universally utilized.

My present invention contemplates the novel construction of a single fitting or fixture capable of taking either the inlet water supply or outlet service pipe, together with an overflow pipe or conduit, permitting escape of water from surplus pressure in the pressure relief valve apparatus, or permitting air to enter the boiler therethrough when the vacuum release valve operates, as well also as permitting the overflow of water in case a fusible plug opens from excessive temperature.

A combination of these various capabilities in one fixture is, so far as I am informed, a distinct novelty in this art and I wish to claim the same herein broadly.

Figure 2:
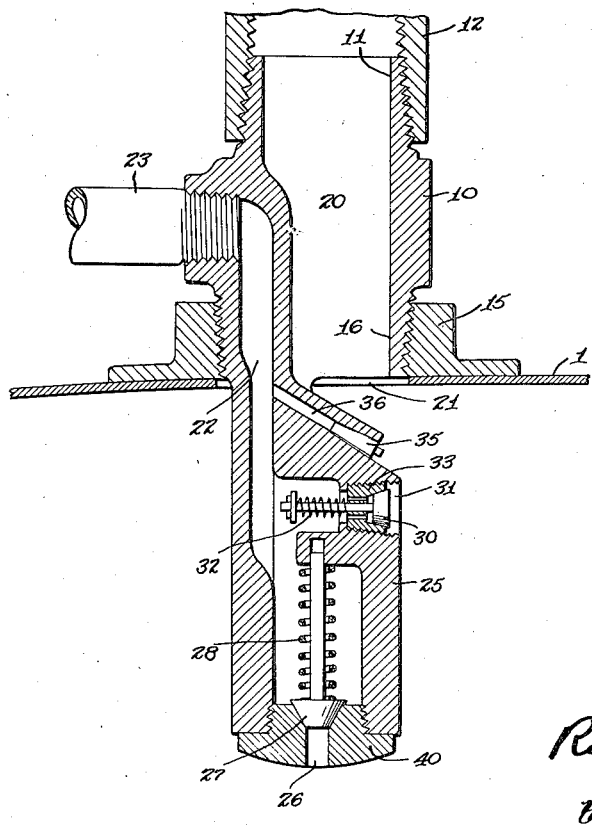

Referring to the drawing illustrating a preferred embodiment of my invention,

Fig. 1 is a partial view of a conventional type of hot water boiler or heater; and Fig. 2 is an enlarged cross-sectional view showing the combined features of my novel valve.

Referring to the drawing, I designates a typical form of vertical hot water heater or boiler ordinarily employed in domestic household use, wherein a supply pipe 2 from any suitable source of cold water supply is tapped into the boiler by means of the elbow 3, short connection 4, and a boiler fitting 5. A service pipe leading hot water from the boiler 6 is applied to my novel fitting 10 by a union 12, threaded onto correspondingly threaded portions 11 of the fitting 10 and a short connecting pipe 13 which is, in turn, united to the service pipe 6 by an elbow 14.

A tapped fitting 15 secured to the boiler 1 is threaded to receive the lower threaded portion 16 of my fitting. Preferably both the upper threaded portion 11 and lower threaded portion 16 of my fitting 10 are tapered, as shown. My fitting has a central opening or conduit portion 20 of sufficient capacity to supply the service pipe 6 through the opening 21. In the fitting 10 and at one side thereof is a channel 22 cast, cored, or otherwise formed, having an outlet port in communication with the drain pipe 23 for the overflow of water, or intake of air.

In the lower portion is an extension 25 carrying a pressure release port 26, and valve 27 opening inwardly into and through the recess 22. Normally this valve is closed by a spring 28.

I also provide an outwardly operating vacuum release valve 30 in the port 31 normally kept closed by an expansible spring 32. The construction herein shown for both the pressure-release and vacuum-relief valves is for illustrative purposes only, and any other suitable or desirable valve construction for these ports could be so utilized.

Also, I provide a fusible plug 35 fitted in a passage 36 opening from the interior of the boiler 1 through the channel 22 in case of excessive temperature melting the fusible plug 35 and permitting release of pressure fluid from the interior of the boiler. As a suitable means of attaching the vacuum release valve 30, I have shown the valve seat 33 threaded into the port 31. The pressure release valve seat cooperating with the valve 27 may be formed in a threaded plug 40 fitted in the bottom of the extension 25 and having the central port 26 therein.

As will be appreciated, I am thus enabled to fit in one fitting or fixture not only the outlet to the service pipe 6, but also the various vacuum, temperature and pressure release instrumentalities through the same fixture and through a port to the outside of the boiler, either with or without the usual drain pipe 23 attached thereto.

Furthermore, it will be appreciated that my novel and improved combined valve and outlet fitting can be similarly utilized in connection with the inlet or supply pipe 2, the open center 20 being of sufficient capacity for either inlet or outlet, and the advantages of having all these devices attached to a single outlet or fitting, thus eliminating the extra work of a plurality of fittings, outlets, tapped openings, leakage, etc., is of great advantage in this particular field.

I claim:

A single fitting of substantially uniform diameter throughout its length for interposition between a boiler and its supply conduit, said fitting having a threaded end for attachment to the supply conduit and a threaded portion intermediate its ends for attachment to the boiler, a large main passage open at the threaded end of the fitting and extending through the side wall thereof just beyond the intermediate threaded portion, a smaller passage extending from the opposite end of said fitting and opening thru the side wall thereof intermediate the threaded portions, said smaller passage having a pressure valve, a vacuum valve and a temperature responsive means mounted therein beyond the threaded portions of the main passage.

RUSSELL B. ALLEN.